United States Patent [19]
Hanslik

[11] 3,929,322
[45] Dec. 30, 1975

[54] MULTISCREW EXTRUDER

[75] Inventor: Wilhelm Hanslik, Vienna, Austria

[73] Assignee: Krauss-Maffei Aktiengesellschaft, Munich, Germany

[22] Filed: Mar. 29, 1974

[21] Appl. No.: 456,251

[30] Foreign Application Priority Data
Apr. 7, 1973 Germany............................ 2317617

[52] U.S. Cl. .............................................. 259/192
[51] Int. Cl.² ............................................ B29B 1/10
[58] Field of Search ............. 259/192, 193, 185, 97; 418/197, 201

[56] References Cited
UNITED STATES PATENTS

| | | | |
|---|---|---|---|
| 724,819 | 4/1903 | Crowley............................ | 418/201 |
| 2,581,451 | 1/1952 | Sennet.............................. | 259/97 X |
| 2,586,842 | 2/1952 | McCallum ...................... | 418/201 X |
| 2,802,238 | 8/1957 | Colombo ............................ | 259/192 |
| 2,908,226 | 10/1959 | Rich et al. ....................... | 418/201 X |
| 3,310,837 | 3/1967 | Wittrock............................ | 259/192 |
| 3,746,319 | 7/1973 | Blach................................. | 259/192 |
| 3,817,496 | 6/1974 | Kratochvil ....................... | 259/97 X |

FOREIGN PATENTS OR APPLICATIONS
211,945   4/1960   Austria .............................. 418/201

*Primary Examiner*—Harvey C. Hornsby
*Assistant Examiner*—Donald B. Massenberg
*Attorney, Agent, or Firm*—Karl F. Ross; Herbert Dubno

[57] ABSTRACT

An extruder has a housing formed with an axial passage and a relatively large-diameter central screw in the passage. A plurality of small-diameter outer screws angularly spaced within the passage about the central screw mesh therewith. The outer screws form outer flow passages of substantially smaller volume and the screw thread of the central screw forms central flow passages of larger volume than where these screws had geometrically complementary threads. The central screw and the outer screws are rotated in opposite senses at the same peripheral speed. In this manner the synthetic-resin material plasticized in the extruder exits from the extruder at the same temperature both in the region of the outer screws and the central screw. The axial length of the screw threads can be different, the gap between their flanks can be different, or the radial gap between their crowns and roots can be different so as to effect this difference in volume.

7 Claims, 6 Drawing Figures

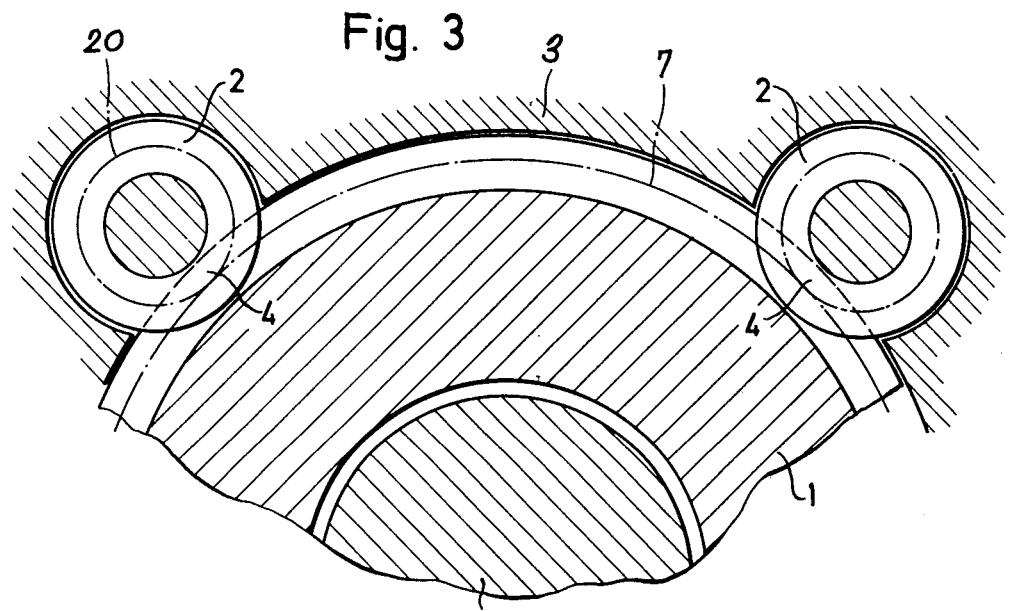
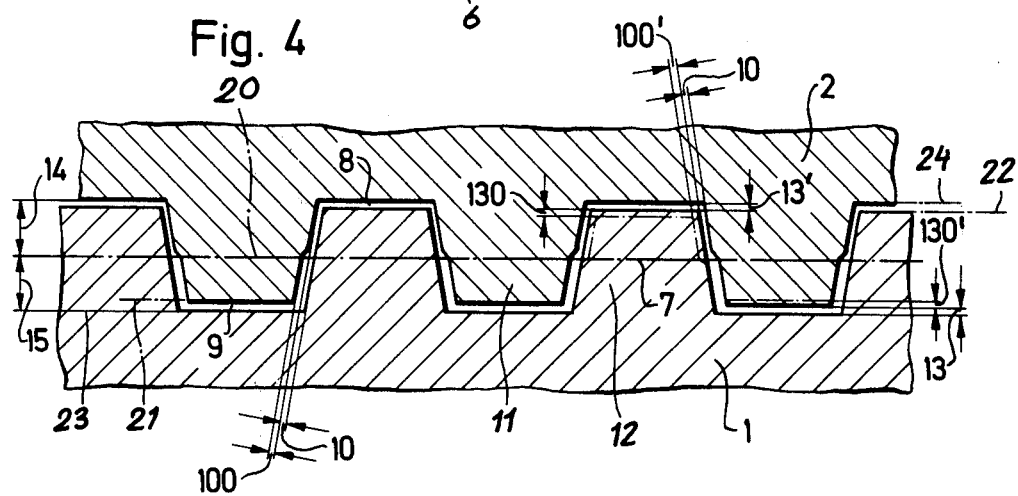
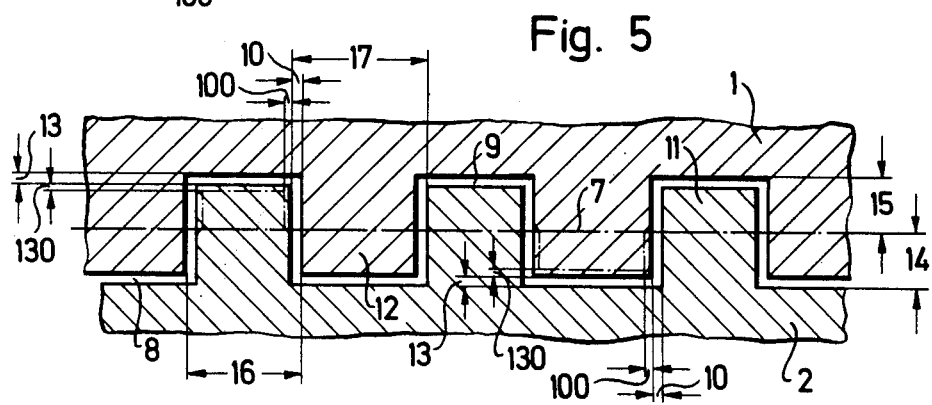

MULTISCREW EXTRUDER

CROSS REFERENCE TO RELATED APPLICATIONS

This application is related to copending applications Ser. Nos. 400,059 filed Sept. 9, 1973 and 417,753 filed Nov. 21, 1973.

FIELD OF THE INVENTION

The present invention relates to a multiscrew extruder. More particularly this invention concerns such an extruder having a large-diameter central screw and a plurality of small-diameter peripheral screws meshing with this central screw.

BACKGROUND OF THE INVENTION

There is known a type of extruder having a pair of similar diameter screws formed with geometrically complementary meshing threads of opposite hand so that these screws can be rotated in opposite directions while remaining in mesh with each other. Thus housing is formed with a throughgoing passage of figure-eight section, each of the screws lying to one side of a gap corresponding to the waist of the figure eight. The material to be plasticized and/or extruded is fed into the passage at one end thereof and is kneaded and compressed as it is moved axially along the passage toward the outlet end thereof. Two in-line groups of C-shaped compartments or flow passages are thereby formed, one group around each of the screws. The plasticized mass fills these compartments and moves from compartment to compartment of the same group by being squeezed over the thread of the respective screw, and also migrates from the compartment of the one group to those of another and back as this material is squeezed through the waist of the axially extending passage.

Such an apparatus has considerable disadvantages. First of all it is extremely expensive. These screws of necessity are very costly to machine. Furthermore unequal radially acting pressures on each of the screws tend to force them into engagement with the inner wall of the housing, thereby generating considerable heat and causing the screws to wear.

In another known type of extruder there is a large central worm or screw which meshes with a plurality of angularly equispaced smaller worms or screws. The principle of operation of this type of extruder is similar, with the treatment compartments being subdivided into groups each corresponding to the C-shaped compartments of the small screws, and into arcuate compartments corresponding to the regions along the periphery of the central screw between two of the outer screws. Again in this arrangement the screws are counterrotated so as to heat up the thermoplastic synthetic-resin material by shear and friction.

The considerable advantage of this type of extruder is that only the central screw need be of large diameter. So long as the outer screws are angularly equispaced about this central screw, the latter virtually floats within the treatment passage in the housing so that it has a long service life. It is possible to produce a large-capacity machine in this manner providing a single large-diameter central screw and a relatively large number of smaller, and hence cheaper to manufacture, counterscrews in mesh therewith.

As a general rule such devices are designed so that the relative pitches of the central screw and the outer screws are inversely proportional to their rotation speeds. The principal problem in such systems is however that resin tends to heat up a great deal more in the chambers on the central screw than it does in the chambers of the outer screws. This problem makes it difficult to extrude heat-sensitive materials such as rigid PVC, as thermal degradation is likely.

OBJECTS OF THE INVENTION

It is therefore an object of the present invention to provide an improved extruder.

Another object of this invention is the provision of an improved multiscrew extruder having a large-diameter central screw and a plurality of angularly equispaced small-diameter screws meshing therewith.

Yet another object is the provision of a multiscrew extruder wherein the plastification and the throughput of the thermoplastic synthetic-resin material is the same in both the central screw and in the outer screws.

SUMMARY OF THE INVENTION

These objects are attained according to the present invention in a multiscrew extruder having a large-diameter central screw meshing with a plurality of angularly equispaced small-diameter screws. Means is provided to rotate all of these screws so that their peripheral velocities are the same. According to this invention the volume of the flow passages of the outer or auxiliary screws is decreased and the volume of the flow passages of the central screw is increased over what these volumes would be if the screwthreads of the central and auxiliary screws were geometrically complementary, i.e. the groove and thread cross-sections were geometrically similar.

This is achieved, according to the present invention, by dimensioning the cross-sectional area of the screwthread on the central screw and on the outer screw so that the former area is smaller than the latter. It is also within the scope of the present invention to increase the volume of material treated by the central screws and decrease that treated by the auxiliary screws by increasing the clearance between the screw threads of these screws either by increasing the flank spacing, or increasing the root or crown spacing.

According to the present invention the ratio of the profile areas of the threads defining the flow passages of the outer screws to the profile areas of the inner screw is in an inverse proportion to the ratio of their surface areas, i.e. the ratio of thread lengths. In this manner the width of the flow passage of the central screw is up to 20 percent smaller than those of the outer screws.

In accordance with a further feature of the invention the radical gap, that is gap between the root cylinder of the central screw and the crown sylinder of the outer screw, those imaginary cylinders osculating the roots and crowns of the screws, is up to 50 percent greater than the radial gap between the crown cylinder of the central screw and the root cylinder of the outer screw.

According to yet another feature of this invention the flank gap, that is the axial gap between the flank of one of the screw threads and a screw thread meshing therewith is wider outside the pitch circles of one of the screws. Also according to this invention the sum of the diameters of the outer screws is equal to the diameter of the inner screw.

The present invention allows synthetic resins of different viscosities and different flow characteristics to be plasticized to the same extent both by the central screw and the outer screws, with like throughput and heat buildup. This is possible because the amount of synthetic-resin material traveling around each of the outer screws and the so-called nip between the outer screws and the inner screws is the same as the amount of material traveling around the inner screw.

In accordance with another feature of this invention the central or inner screw is subjected to very little wear, since the radial pressures exerted on it come from all directions and it is not pressed against a housing in any region. Equalization of the side pressure also eliminates wearing between the outer screws and their housing. This is effected in part by the decrease in axial material advance rate in the central screw and the increases in material advance rate by the outer screws. The pitch of the screws is determined according to the rotation rate as well as the shear.

BRIEF DESCRIPTION OF THE DRAWING

The above objects, features, and advantages will become more readily apparent, reference being made to the accompanying drawing in which:

FIG. 3 is a detail of FIG. 1 in larger scale;

FIGS. 4 and 5 are longitudinal sections through two thread forms according to the present invention.

SPECIFIC DESCRIPTION

Figure 1:
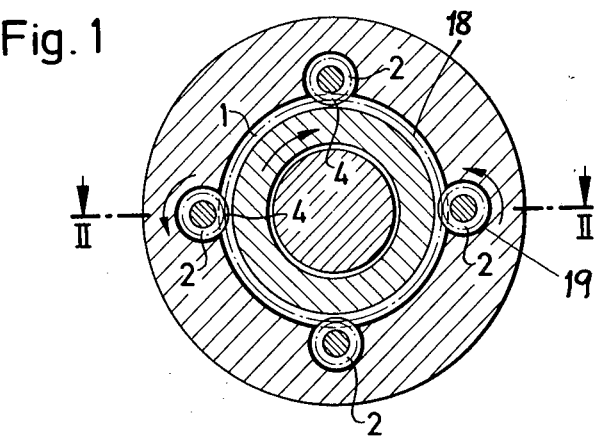
FIG. 1 is a cross section through an apparatus according to the present invention.
Figure 2:
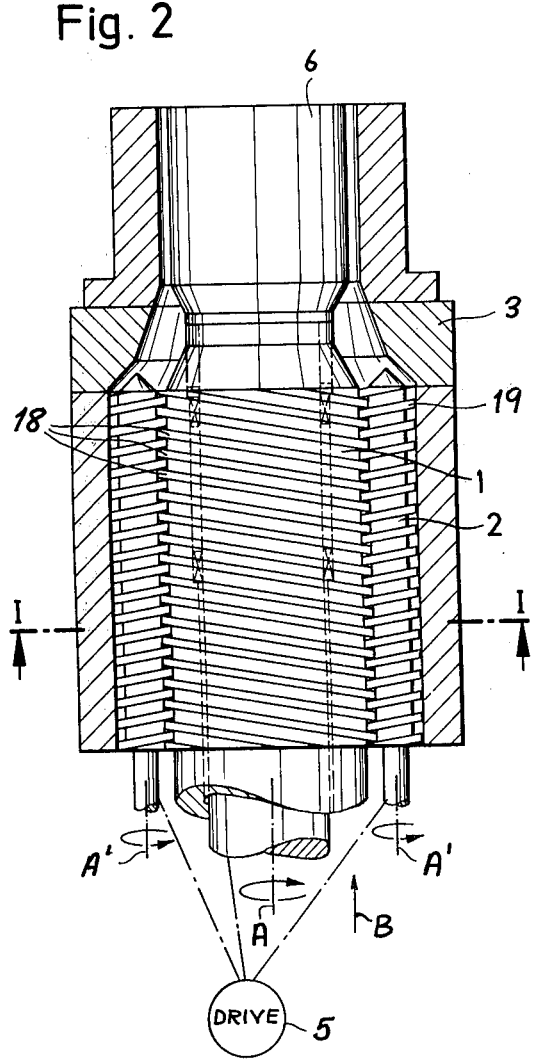
FIG. 2 is section taken along line II—II of FIG. 1, the section plane of FIG. 1 being indicated by line I—I.

As shown in FIGS. 1 and 2 a steel housing 3 is formed with a large central bore 18 and four angularly equi-spaced outer bores 19 opening onto the central bore. A central screw 1 carried on a fixed mandril 6 at the downstream end of the housing 3 is received in the inner bore 10 and four smaller screws 2 are each received in a respective outer bore 19. A motor 5 is attached to all of these screws 1, 2 to rotate the screw 1 about its axis A clockwise and the screws 2 counterclockwise about their axes A' with the same peripheral speed.

Figure 6:
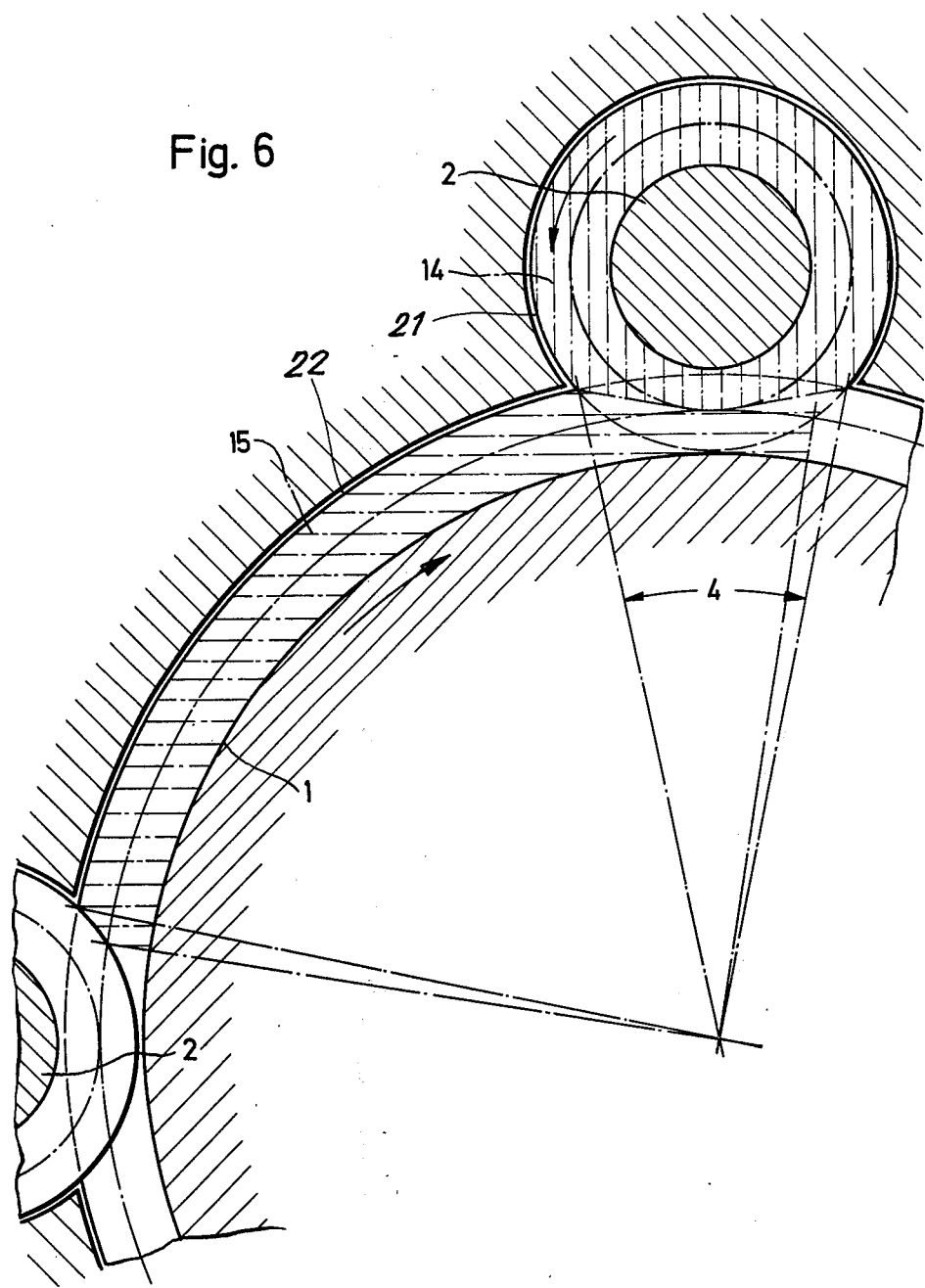
FIG. 6 is another detail view of FIG. 1 in greatly enlarged scale.

The central screw 1 has a quadruple screw thread 12 of pitch $4_p$ and form central arcuate flow passages indicated schematically at 15 in FIG. 6. The screws 2 each have a single screw thread 11 of pitch $p$ and form auxiliary flow passages indicated at 14 in FIG. 6. The inner screw 1 has a diameter four times greater than that of the outer screws 2.

This synthetic-resin material in passages 14 and 15 is circulated around the screws 1 and 2 and over the threads 16 and 17 thereof so as to move from the inlet end to the outlet end of the extruder in the direction of arrow B.

That portion of the material which is ejected from the apparatus on each rotation of the screws thereof divided into the volume contained by the apparatus gives the throughput ratio. The amount of heat imparted to the thermoplastic work stuff increases with the same volume and throughput when the energy imparted to it by shear, friction, and flow by the central screw and the outer screws is the same.

The pitch circle 7 of the central screw 1 and the pitch circle 20 of the outer screws 2 osculate. A meshing zone 4 is defined within the crown circle 21 of the outer screws 2 and the crown circle 22 of the inner screw 1. In this zone 4 there is interchange of material between the regions 14 and 15 so that the pressure around the outer screws 2 and the inner screw 1 is equalized.

FIG. 4 shows how the screw thread 18 is of generally trapezoidal section. Defining a radial gap 9 of thickness 13 between the root cylinder 23 of the inner screw 1 and the crown cylinder 21 of the auxiliary screw 2 having a thickness 13' equal to the thickness 13' between the crown cylinder 22 of the inner screw 1 and the root cylinder 24 of the illustrated outer screw.

The screw thread 11 of the screw 2 is of generally trapezoidal shape but is of reduced thickness outside the pitch circle 20 so that the gap 10 between the flanks of the screw threads 12 and 11 is increased by an amount 100 outside this pitch circle 20.

This increases material transfer from the region 14 to the region 15 and vice versa at the zone 4 where the two crown cylinders overlap.

It is also within the scope of the present invention to increase the gap 10 by cutting the thread 18 back as shown at 100' outside of the pitch circle 7, and by increasing the gap 13 between the circles 21 and 23 by an amount 130'.

The arrangement shown in FIG. 5 is identical to that shown in FIG. 4 with the exception that the screw threads 11' and 12' of the screws 2 and 1 are here of square section, with the axial length 16 of the groove between following turns of the screw thread 12' being substantially smaller than the axial length 17 of the groove between following turns of the screw thread 11'.

I claim:

1. In an extruder for thermoplastic synthetic resin having a plurality of parallel auxiliary screws each formed with a respective auxiliary screw thread, and a central screw parallel to said auxiliary screws and formed with a respective central screw thread meshing with said auxiliary threads at meshing zones, said central thread defining a plurality of main flow passages between said zones and said auxiliary threads defining a plurality of auxiliary flow passages outside the respective zones, the improvement comprising:

means for rotating all of said screws about their axes with the same peripheral speed, said central and auxiliary screws having respective crown cylinders, the sum of the diameters of said crown cylinders of said auxiliary screws being substantially equal to the diameter of said crown cylinders of said central screw and the ratio of profile areas of the threads of the auxiliary screws to that of the threads of the central screw is in an inverse proportion to the ratio of their lengths.

2. The extruder defined in claim 1 wherein said screw threads of said auxiliary screws are stepped inwardly at least outwardly of pitch cylinders of said auxiliary screws, whereby the axial gap between the flanks of said screw threads of said auxiliary screws and the flanks of the screw thread of said central screw is greater outside the pitch cylinders of said auxiliary screws in the region of mesh of said central and auxiliary screws.

3. The extruder defined in claim 1 wherein said screw threads of said auxiliary screws of said central screw have respective root cylinders, the root cylinder of said central screw being spaced from the crown cylinders of said auxiliary screws by a distance equal to the spacing of the crown cylinder of said central screw from the root cylinders of said auxiliary screws.

4. The extruder defined in claim 1 wherein the axial length of said threads of said auxiliary screws is generally 20% shorter than the axial length of said screw of said central screw.

5. The extruder defined in claim 1 wherein said screw threads of said auxiliary screws and of said central screw have respective root cylinders, the root cylinder of said central screw being spaced from the crown cylinders of said auxiliary screws by a distance greater than the spacing between the crown cylinder of said central screw and the root cylinders of said auxiliary screws.

6. The extruder defined in claim 3 wherein said screw threads are of substantially rectangular section.

7. The extruder defined in claim 5 wherein said distance between said root cylinder of said central screw and said crown cylinders of said auxiliary screws is generally 50 percent greater than the spacing between the crown cylinder of said central screw and the root cylinders of said auxiliary screws.

* * * * *